United States Patent
Diab et al.

(10) Patent No.: US 9,594,369 B2
(45) Date of Patent: Mar. 14, 2017

(54) SELECTIVE INDUSTRIAL POWER-OVER-NETWORK CONFIGURATION AND OPERATION

(71) Applicant: Broadcom Corporation, Irvine, CA (US)

(72) Inventors: Wael William Diab, San Francisco, CA (US); Yasantha Rajakarunanayake, San Ramon, CA (US); Patricia Ann Thaler, Carmichael, CA (US)

(73) Assignee: Broadcom Corporation, Irvine, CA (US)

( * ) Notice: Subject to any disclaimer, the term of this patent is extended or adjusted under 35 U.S.C. 154(b) by 430 days.

(21) Appl. No.: 14/180,097

(22) Filed: Feb. 13, 2014

(65) Prior Publication Data

US 2015/0094868 A1 Apr. 2, 2015

Related U.S. Application Data

(60) Provisional application No. 61/924,441, filed on Jan. 7, 2014, provisional application No. 61/885,303, filed on Oct. 1, 2013.

(51) Int. Cl.
| | |
|---|---|
| G05B 19/418 | (2006.01) |
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |

(52) U.S. Cl.
CPC ......... *G05B 19/4185* (2013.01); *Y02P 90/18* (2015.11); *Y02P 90/185* (2015.11)

(58) Field of Classification Search
None
See application file for complete search history.

(56) References Cited

U.S. PATENT DOCUMENTS

| | | | |
|---|---|---|---|
| 8,294,573 B2 * | 10/2012 | Mermet | G01S 5/0027 340/539.3 |
| 2007/0057783 A1 * | 3/2007 | Reller | G05B 19/042 340/538 |
| 2007/0250649 A1 * | 10/2007 | Hickey | G06F 13/385 710/62 |

(Continued)

OTHER PUBLICATIONS

LTC4274, Single PoE+ PSE Controller, Linear Technology Corporation, Milipitas, California, 2009, 28 pages.

(Continued)

*Primary Examiner* — Eric C Wai
(74) *Attorney, Agent, or Firm* — Oblon, McClelland, Maier & Neustadt, L.L.P.

(57) ABSTRACT

An industrial process environment uses selective power-over-network (PoN) techniques to facilitate configuration, operation, communication, and other operations for the industrial nodes in the environment. The network may be an Ethernet network, and the environment may selectively deliver power-over-Ethernet as well as command, configuration, or other data over the network connection. The environment may perform the techniques over other types of networks or combinations of networks in addition to or instead of Ethernet networks.

20 Claims, 7 Drawing Sheets

(56) References Cited

U.S. PATENT DOCUMENTS

2011/0107116 A1\* 5/2011 Diab ................... H04L 12/10
   713/300
2011/0240620 A1\* 10/2011 Ott ..................... B23K 9/124
   219/130.5

OTHER PUBLICATIONS

IEEE Standard for Information Technology, Part 3: Carrier Sense Multiple Access with Collision Detection (CSMA/CD) Access Method and Physical Layer Specifications, IEEE Computer Society, New York, New York, Oct. 30, 2009, 140 pages.

BCM59111, Highly Integrated Power Over Ethernet PSE Controllers, Broadcom Corporation, Irvine, California, Nov. 4, 2011, 2 pages.

\* cited by examiner

SELECTIVE INDUSTRIAL POWER-OVER-NETWORK CONFIGURATION AND OPERATION

1. PRIORITY CLAIM

This application claims priority to U.S. Provisional Application Ser. No. 61/924,441, filed Jan. 7, 2014, titled "Selective Industrial Power Over Network Configuration and Operation," and U.S. Provisional Application Ser. No. 61/885,303, filed Oct. 1, 2013, titled "Systems and Methods for Industrial Ethernet," which are incorporated herein by reference in their entirety.

2. TECHNICAL FIELD

This disclosure relates to networked industrial nodes in an industrial process environment. In particular, this disclosure relates to delivery of power over network connections, including power-over-Ethernet, and to the selective configuration and control of the industrial nodes in the industrial process environment.

3. BACKGROUND

High speed data networks form part of the backbone of what has become indispensable worldwide data connectivity. Networks have found a role in the industrial environment as well, with industrial Ethernet (for example) providing one interconnection technology for industrial nodes, such as machinery on an assembly line. Improvements in the selective configuration and control of industrial nodes over the network will further enhance the capabilities of these networks.

DETAILED DESCRIPTION

Figure 1:
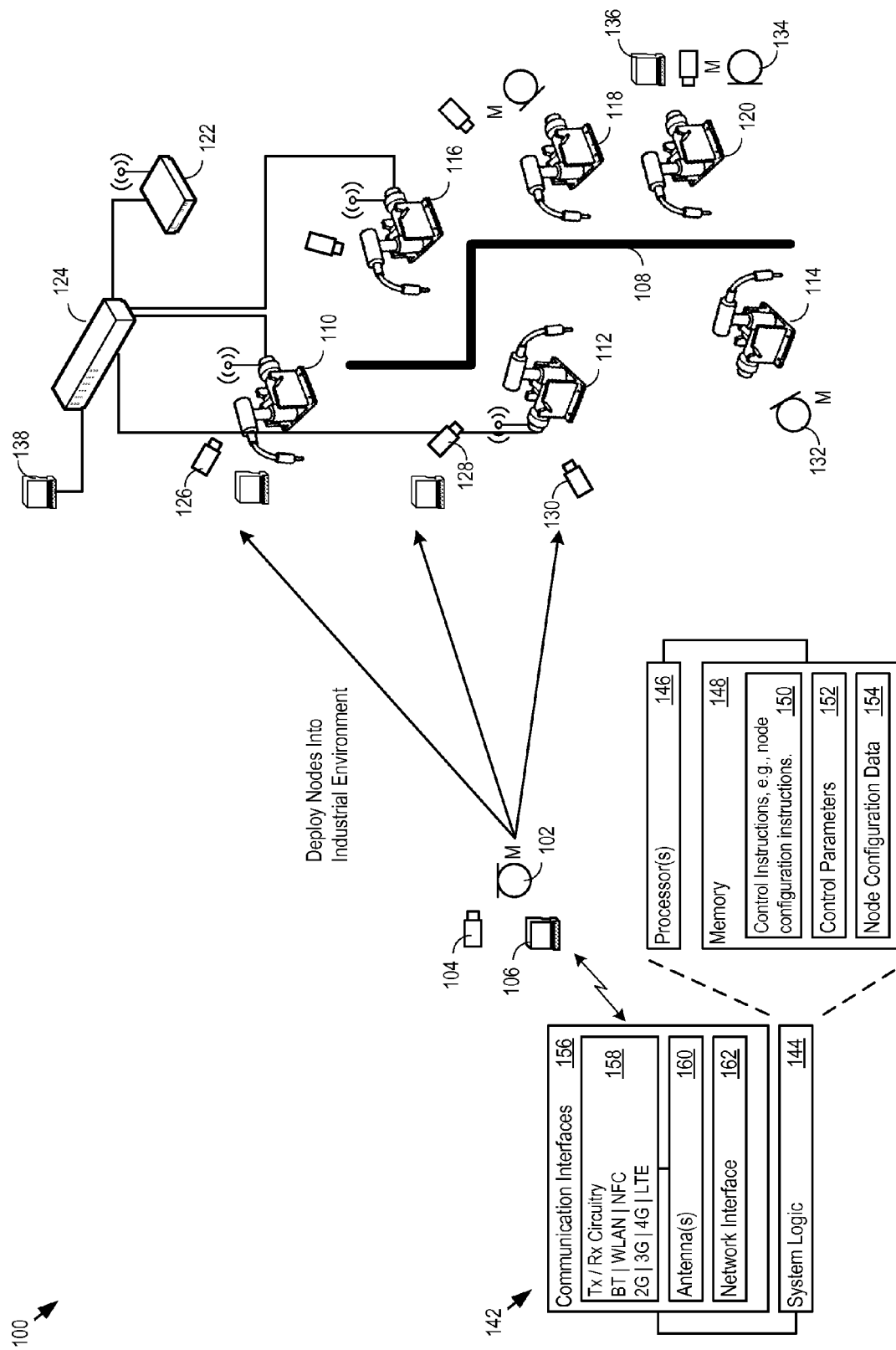
FIG. 1 shows an example of an industrial process environment.

FIG. 1 shows an example of an industrial process environment 100 ("environment 100"). The environment 100 uses selective power-over-network (PoN) techniques to facilitate configuration, operation, communication, and other operations for the industrial nodes in the environment 100. The network may be an Ethernet network, and the environment 100 may selectively deliver power-over-Ethernet. The environment 100 may perform the techniques over other types of networks or combinations of networks in addition to or instead of Ethernet networks.

Examples of industrial nodes include sensors such as microphones (e.g., the microphone 102), cameras (e.g., the camera 104), temperature, energy (e.g., infrared, visible, or Radio Frequency (RF) energy), vibration, moisture, and other types of sensors; controllers (e.g., the process controllers 106, 136, and 138) that, e.g., control, direct, or otherwise manage the operation of industrial nodes; and machines that operate within the environment 100 as part of any predefined industrial process, e.g., welders, pumps, conveyors, presses, injectors, robots, and the like that are setup to manufacture, e.g., an automobile.

The environment 100 may include any number of machines (e.g., the machine 110) arranged, e.g., along a process line 108. The machines may perform any selected operations on items and materials on the process line 108. The example environment 100 in FIG. 1 includes machines 110, 112, 114, 116, 118, and 120, and also shows networking infrastructure that may connect any or all of the industrial nodes together, including, e.g., a wireless access point (WAP) 122 and switch 124. The environment 100 also includes multiple sensors, such as the cameras 126, 128, and 130, the microphones 132 and 134, as well as the process controllers 106, 136 and 138. The industrial nodes may be positioned and configured to monitor and interact with any other industrial nodes of any type, as well as the process line 108 and the items and materials on the process line 108. Any type of industrial node may be present in the environment 100, including as examples, hubs, switches, routers, or bridges, data servers, actuators, generators, motors, machinery, monitoring devices, computers, management or control systems, environment management devices, analysis systems, communication devices, and any mobile device such as a mobile phone, tablet, and the like. The networking infrastructure may connect together any of the industrial nodes using any combination of wireless and wired networking technologies, e.g., Ethernet, 802.11 a/b/g/n/ac WiFi, proprietary industrial networking, or other technologies.

The machines 110-120 may be implemented as any machinery, robotics, tooling, or other machinery that participate in any operations (e.g., assembly or disassembly). The machines 110-120 may be arranged along the process line 108. The machines 110-120 may be communicatively linked to control devices (e.g., programmable logic controllers) that provide signals to the machines 110-120 that monitor, guide, or control the machines 110-120. In FIG. 1, for instance, the process controller 138 is communicatively linked to the machines 110-120 through the switch 124. In some variations, the process controller 138 is a programmable logic controller (PLC).

The sensors may monitor selected locations in the environment 100. For instance, the sensors may be positioned at predetermined monitoring locations along the process line 108, e.g., proximate to the machines 110-120. The sensors may sense environmental data, such as visual data, audio data, vibration data, temperature data, positional or movement data, or any other environmental data indicative of a characteristic of the environment 100 or the industrial nodes. The industrial nodes may communicate sensed data to any other industrial node in the environment 100, or to nodes external to the environment 100.

The environment 100 supports multiple communication links between any of the industrial nodes inside and outside the environment 100. The communication links may provide redundancy or failover capabilities between the communicating industrial nodes. As one such example, the process controller 138 is linked to the machine 110 through both a wired communication path, e.g., via the switch 124 and a wireless communication path, e.g., via the WAP 122. The industrial nodes may in that regard communicate across multiple technologies, including any number of wired technologies and/or wireless technologies.

Any industrial node in the environment 100 may include a communication interface that supports one or more communication links to other industrial nodes inside or outside of the environment 100. A communication interface may be configured to communicate according to one or more communication modes, e.g., according to various communication techniques, standards, protocols, or across various networks or topologies. The communication interfaces may support communication according to particular quality-of-service (QoS) techniques, encoding formats, and any selected physical (PHY) interfaces. For example, a communication interface may communicate according to any of the following network technologies, topologies, mediums, protocols, or standards: Ethernet including Industrial Ethernet, any open or proprietary industrial communication protocols, cable (e.g. DOCSIS), DSL, Multimedia over Coax Alliance (MoCA), power line (e.g. HomePlug AV), Ethernet Passive Optical Network (EPON), Gigabit Passive Optical Network (GPON), any number of cellular standards (e.g., 2G, 3G, 4G, Universal Mobile Telecommunications System (UMTS), GSM Association, Long Term Evolution (LTE), or others), WiFi (including 802.11 a/b/g/n/ac), WiMAX, Bluetooth, Near Field Communications (NFC), WiGig (e.g., 802.11ad), and any other wired or wireless technology or protocol.

FIG. 1 also shows a particular example of an industrial node in the form of a programmable logic controller (PLC) 142. The PLC 142 may be implemented in hardware, software, or both. The PLC 142 may be implemented, for example, in a system on a chip (SoC), application specific integrated circuit (ASIC), or other circuitry. In some implementations, the system logic 144 of PLC 142 includes one or more processors 146 and memories 148. The memory 148 stores, for example, control instructions 150 (e.g., program instructions) that the processor 146 executes to carry out any of the PoN techniques described below. The memory 148 may also store control parameters 152 and other data 154, such as industrial node configuration data.

The control instructions 150, control parameters 152, and data 154 may facilitate programming, control, and communication with industrial nodes through PoN techniques. In that respect, the communication interface 156 may implement any of the wired or wireless technologies noted above to selectively deliver power to any of the industrial nodes, and selectively control or configure any of the industrial nodes over the network interface. The antenna(s) 160 facilitate wireless communication operations with the PLC 142, and the network interface 162 (e.g., an Ethernet interface) facilitates wired communication operations with the PLC 142.

Figure 2:
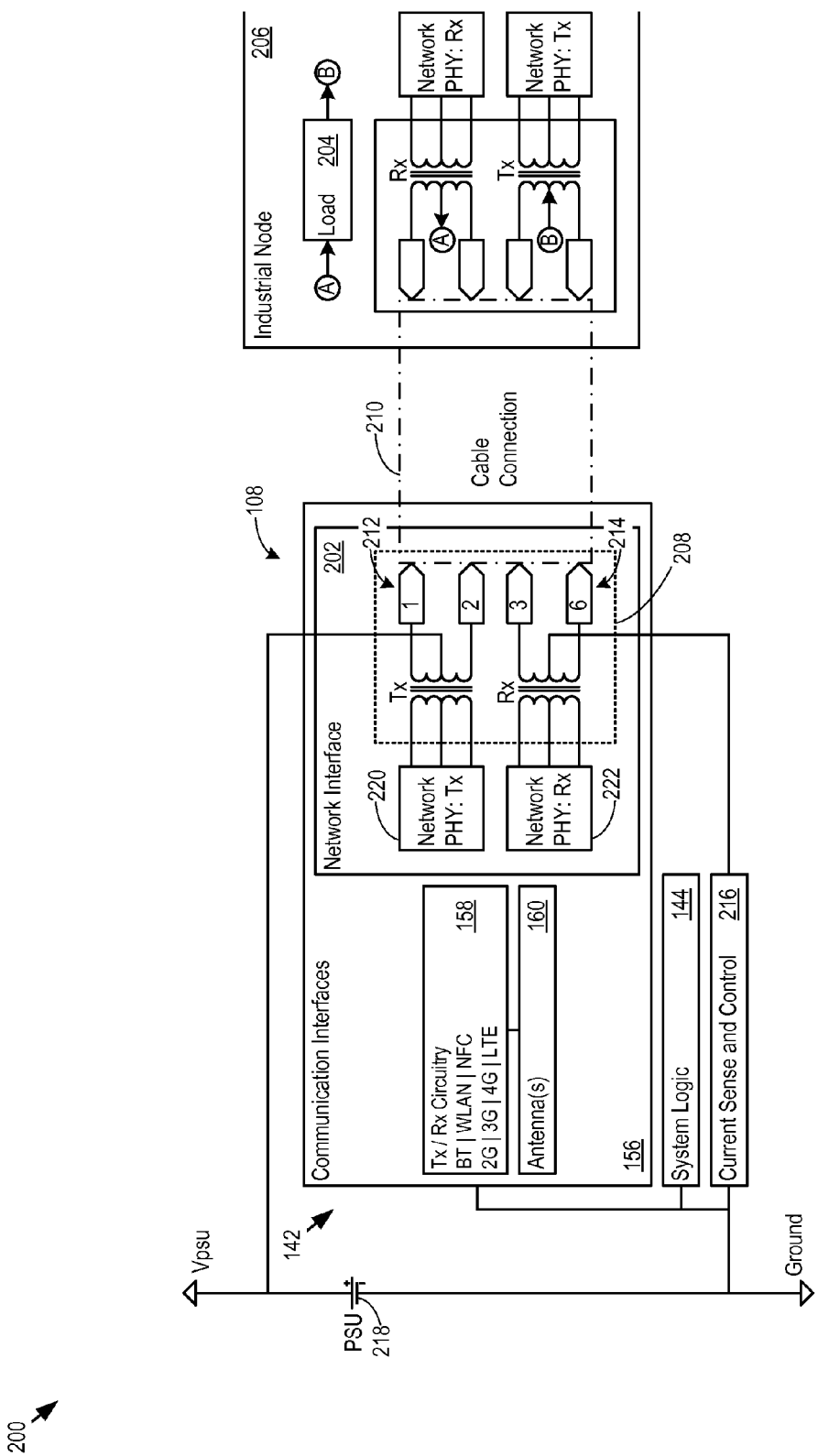
FIG. 2 shows an example network interface for selectively provided power to an industrial node.

FIG. 2 shows an example system 200 including a network interface 202 for selectively providing power to an industrial node. The network interface 202 may be included in a device that provides power, e.g., power sourcing equipment (PSE), into the network. The PSE facilitates selective provisioning and application of power to any load 204. The load 204 may be included in any powered device (PD), for instance in any industrial node 206 in the industrial environment.

The PSE may be any industrial node. As examples, the PSE may be the PLC 142, the switch 124, the process controller 138, or a midspan that provides power while passing through data. A midspan may be used in the environment 100 to add power delivery to an existing non-power delivery network. The load 204 may be a part of virtually any PD, such as a security camera, machine, sensor, controller, or any other PD.

IEEE standards define some types of power delivery over Ethernet networks. For example, IEEE 802.3af specifies a maximum allowed continuous output power (per cable) of 15.40 Watts (W) with a current limit of 350 mA. The IEEE 802.3at standard specifies 25.50 W with a current limit of 600 mA. The PSE may deliver power over other types of network connections in addition to Ethernet, however. Described below are techniques that provide a way to selectively deliver power to any of the industrial nodes, and selectively control or configure any of the industrial nodes over the network interface.

The network interface includes a network connection 208. The network connection 208 may take the form an RJ45 network port into which a network cable 210 connects to provide a current delivery mechanism to the load 204. As one example, the network may be an Ethernet network. The techniques described are not limited to any particular network or network connection, however. Instead, as examples, many other network connections may be used, such as RJ48, RJ61, RJ11, or other network connections for Ethernet or other types of networks.

The network connection 208 includes a transmit connection 212 (e.g., pins 1 and 2 of an Ethernet RJ45 port) and a receive connection 214 (e.g., pins 3 and 6 of an Ethernet RJ45 port). Current sense and control logic 216 may implement a current sensor and a switch (e.g., a pass-Field Effect Transistor (FET)) to monitor current flow, and control the switch to permit or prevent current flow through the load 204. The current sense and control logic 216 may include a PSE controller, such as a Broadcom BCM59111 power over Ethernet PSE controller. The power supply unit (PSU) 218 may generate, e.g., nominally 12V, 48V, 60V or other higher or lower voltages. The PSU 218 also sources the load current to meet or exceed whatever load current limit is desired for any number of PDs.

Note also that network physical (PHY) layers are present to send and receive data signals over the network connection 208. There may be, for example, an Ethernet PHY Tx layer 220 for transmitting data, and an Ethernet PHY Rx layer 222 for receiving data. However, as noted above, the techniques described may be used with other types of networks besides Ethernet, and in that case, corresponding network PHY layers may be provided to handle data transmission and reception. Accordingly, the examples above are just a few of the many possible design implementations, and many other implementations are possible. As noted previously, the system logic 144 may include control instructions 150 that selectively deliver power to any of the industrial nodes, and selectively control, communicate with, and configure any of the industrial nodes over the network interface.

Figure 3:
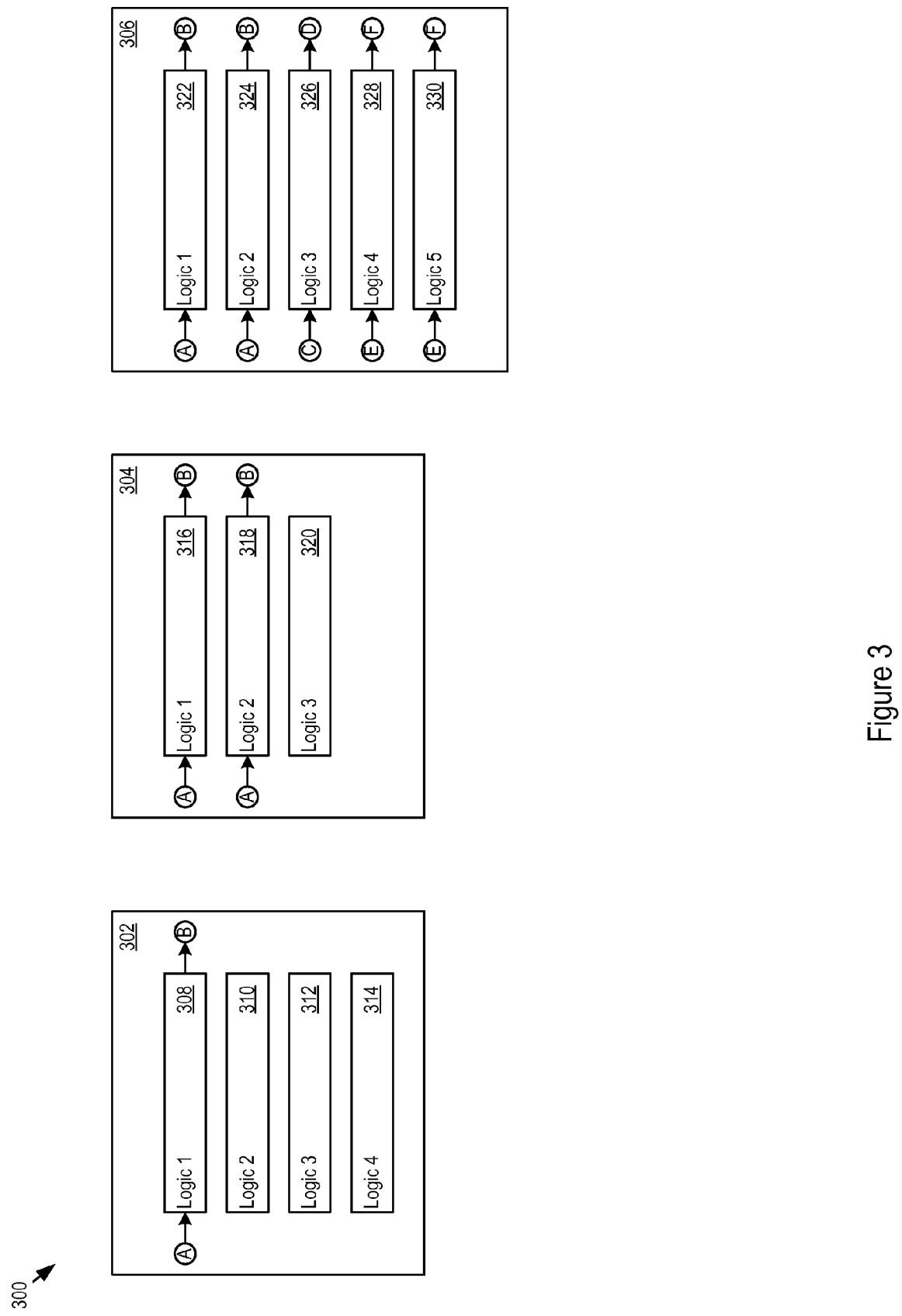
FIG. 3 shows example loads in industrial nodes.

FIG. 3 shows an example of loads 300 in different industrial nodes 302, 304, and 306. The industrial nodes 302-306 may include any number or type of logic blocks. For instance, the industrial node 302 includes the logic block 308, 310, 312, and 314. Each logic block may include any type of hardware that consumes power. For instance, a logic block may be a microcontroller and memory, a power supply, an amplifier, a motor or actuator, a configuration interface, a communication interface, a display, or any other type of circuitry.

A network connection may provide power to any or to no logic blocks in an industrial node. For instance, the network connection 208 (as denoted by the power connection A-B) may provide power to both the logic block 316 and the logic block 318 in the industrial node 304, but not to the logic block 320. An industrial node may include multiple network connections that independently provide power to different logic blocks (e.g., as denoted by the power connections C-D and E-F). In the industrial node 306, three different network connections provide power: one network connection provides power to the logic blocks 322 and 324, a different network connection provides power to the logic block 326, and a third network connection provides power to the logic blocks 328 and 330.

Note also that a logic block may control the application of power to other logic blocks in an industrial node. For instance, in the industrial node 302, the logic block 308 may selectively provide or enable power, e.g., through a FET switch, to the logic blocks 310, 312, and 314. Accordingly, a network connection that provides power to the logic block 308 may also control the logic block 308 to selectively provide or cut power delivery to other logic blocks to which the network connection is not directly connected.

For example, the network connection may selectively provide power to the logic block 308, and send commands or configuration data to the logic block 308. The commands or configuration data may cause the logic block 308 to power-up any other logic blocks, and read or write any data to those logic blocks. For instance, the logic block 308 may provide those logic blocks with commands or configuration data, read data (e.g., the results of a test or of a configuration command), or perform other actions on those logic blocks. The logic block 308 may read or write any data across the network connection to the industrial node providing the power to the logic block 308, or to any other industrial node using any other communication interface available in the industrial node 302.

Figure 4:
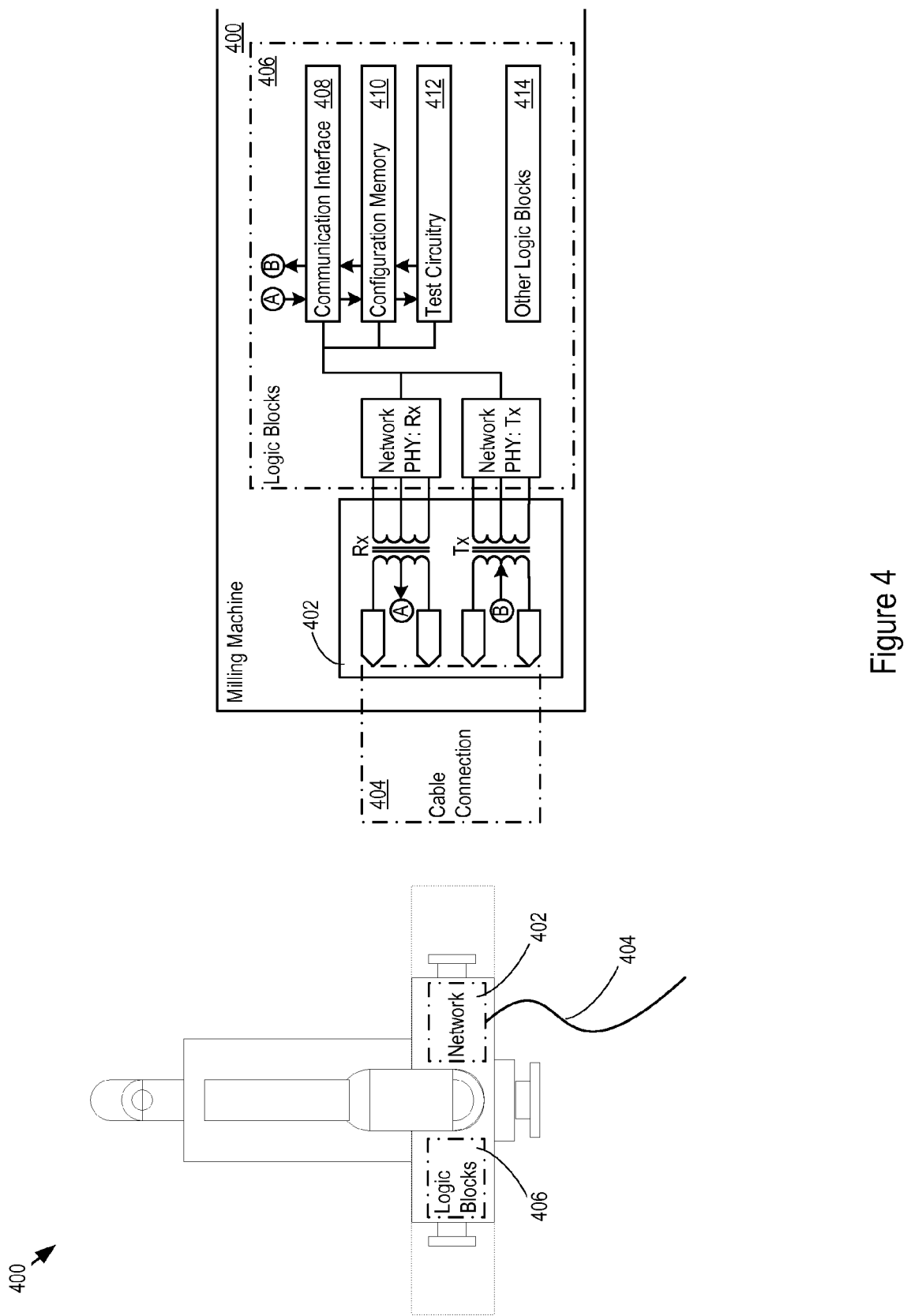
FIG. 4 shows an example milling machine responsive to PoN techniques.

FIG. 4 shows a specific example in which a milling machine 400 includes a network interface 402 connected to a network cable 404 as well as logic blocks 406. The logic blocks 406 include a communication interface 408 (e.g., an Ethernet interface), a configuration memory 410, and test circuitry 412. There may be any number and type of additional logic blocks 414 in the milling machine 400, such as motors, actuators, cutter or tool interfaces, an X-Y table interface, and associated controllers. The network interface 402 provides power as denoted by the A and B connections to any pre-configured logic blocks, and in this example to the communication interface 408, the configuration memory 410, and the test circuitry 412.

An industrial node such as the PLC 142 may selectively engage in control, communication, and configuration of the milling machine 400. For instance, the PLC 142 may provide power (e.g., 48V at 75 mA) to the communication interface 408 over the network cable 404 without starting up the entire milling machine 400 or requiring the other logic blocks 414 to consume power. The communication interface 408 may communicate with the PLC 142 to accomplish any selected tasks. For instance, the communication interface 408 may receive configuration data for the milling machine 400, and the communication interface 408 may store the configuration data in the configuration memory 410. Similarly, the communication interface may read data from the configuration memory and return the data to the PLC 142, e.g., for troubleshooting purposes.

As another example, the PLC 142 may provide the power for testing purposes. In that respect, the power may flow over the network cable 404 to the test circuitry 412. The test circuitry 412 may then carry out any pre-designed tests on the milling machine 400 (e.g., to test the read/write capabilities of the configuration memory 410), and return test results to the PLC 142. The test circuitry 412 may receive test commands from the PLC 142 through the communication interface 408 that direct the test circuitry 412 to carry out specified tests using specified test parameters.

Given the architecture explained above, an industrial node may engage in selective control, communication, and configuration of any of the other industrial nodes over one or more network interfaces using PoN techniques. Several examples are provided next. It is noted, however, that many other types of behaviors are also possible.

In one implementation, an industrial node may use PoN to power-up or power-down all or part of an industrial node, e.g., to power down all or part of the milling machine 400. Accordingly, the entire industrial node need not be powered-up when probing for connectivity, changing control logic or programming, setting up the industrial node, reading performance, fault, error, or other data, testing communications, setting configurations, or executing other tasks. Instead, the PoN techniques may selectively power-up the logic blocks that carry out a selected task.

The PoN techniques may execute upon initial configuration of an industrial node and in particular during associated configuration and testing of networking. The PoN techniques may also execute when a particular industrial node is selectively turned on, e.g., only occasionally when needed. The PoN techniques may, for example, manage overall power supply for an industrial node. More specifically, PoN may power-up a power control logic block in an industrial node and command the power control block to close specified power switches to deliver power to other parts of the industrial node.

Figure 5:
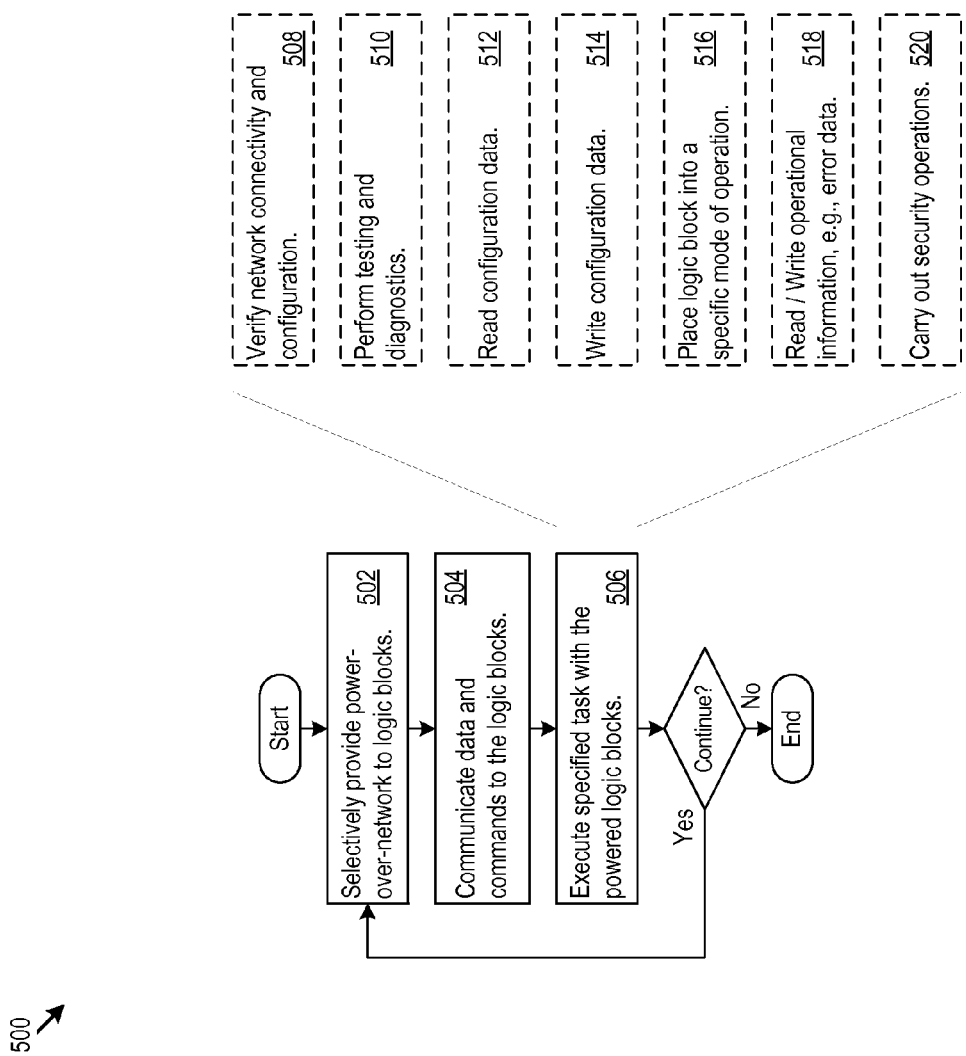
FIG. 5 shows an example of logic that an industrial node may implement.

In those respects, FIG. 5 shows an example of logic 500 that an industrial node may implement, e.g., as the control instructions 150. The logic 500 may provide power (502) and send commands and data (504) to any connected industrial node. The logic 500 may carry out any specified task (506). Examples of tasks include: 1) verify correct connectivity (e.g., network connectivity and configuration) (508); 2) perform testing and diagnostics (510); 3) deliver configuration data (512); 4) retrieve configuration data (514); 5) power up the industrial node or specific logic blocks into a specific mode of operation (516); 6) deliver or retrieve error/fail state information (518); 7) carry out security operations (e.g., configuring security, verifying security states, or running security checks) (520); any of which may be facilitated by powering-up a selected portion or portions of the industrial node using PoN.

Note that an industrial node may modulate control, data, and commands signals on the power signal it delivers, as well as provide control, data, and command signals on conventional Tx/Rx connections. In other implementations, the industrial node may receiver power locally, but may (e.g., while in a powered-down mode) be responsive to the command, control, and data sent by another industrial node, e.g., to carry out any of the tasks noted above or below, including tasks 1-7.

Figure 6:
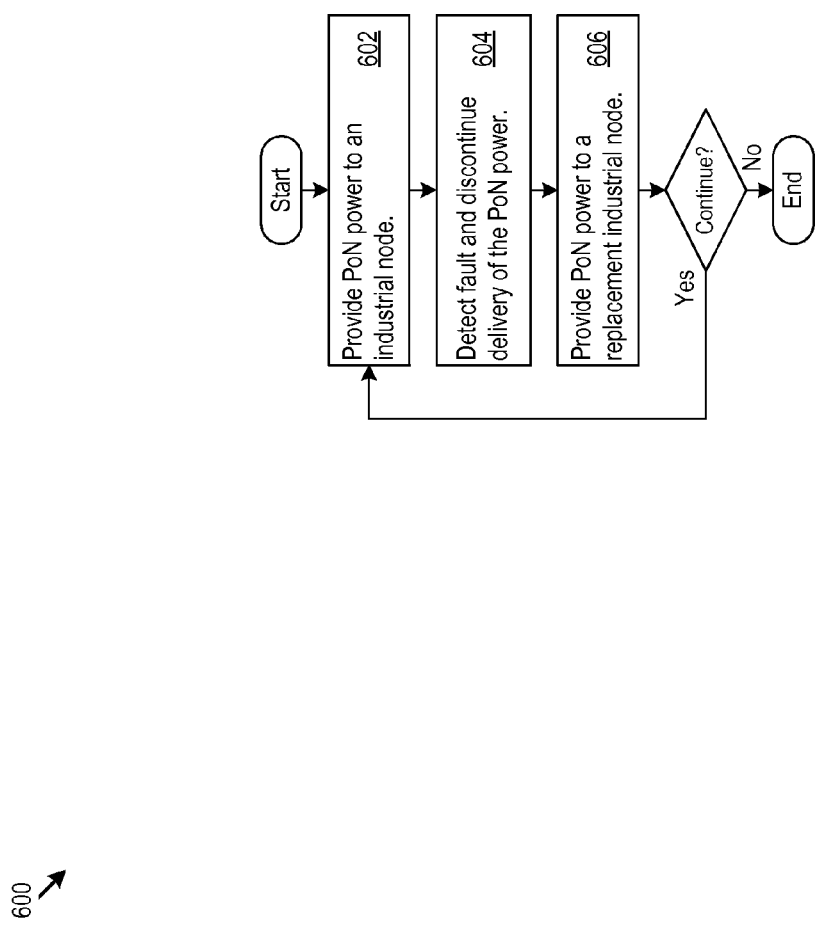
FIG. 6 shows an example of logic that an industrial node may implement.

As an additional example, the PoN techniques may assist in fail-over, as shown in FIG. 6 which illustrates example logic 600 that an industrial node may implement, e.g., in control instructions 150. An industrial node may provide PoN power to another industrial node (e.g., sensor or actuator) (602). The industrial node providing the power may later discontinue PoN delivery to deactivate or disable the industrial node for any reason, e.g., to deactivate a malfunctioning industrial node (604). The logic 600 may then instead provide PoN power to a replacement industrial node, e.g., to effectively swap in the replacement (606). The industrial node providing power may determine to discontinue PoN delivery for many reasons, such as when there is a communication failure with the powered industrial node, when the powered industrial node reports an error, fault, or failure status, to duty cycle the powered industrial node, or for other reasons. As another example, multiple fail-over candidate industrial nodes may participate on a PoN connection, with a selected industrial node monitoring the other industrial nodes. The monitoring node may assume any responsibility and carry out any selected functionality until it fails, at which time any of the other industrial nodes may detect the failure, and assume the responsibilities.

In other implementations, PoN may facilitate propagation of sleep states. For instance, when an industrial node (e.g., a sensor) is asleep, the sleep state may migrate upstream, e.g., to connected upstream ports and all or part of the industrial nodes connected to those ports. As a specific example, assume that a specific powered-down machine is connected to and serviced by sensors, controllers, or other industrial nodes, and that one or more of those servicing industrial nodes are placed in a low power or powered-down state. An upstream industrial node (e.g., a network switch) may detect the low power state (e.g., by sensing reduced current draw), and responsively enter a lower power state. The lower power state may propagate upstream to connected devices in this manner. Upon power-up of an industrial node, the industrial node may send commands to one or more downstream nodes to power-up.

Said another way, the industrial nodes may achieve power control in a network sense. For instance, selective power-up and power-down may cascade through any network connected set of industrial nodes, along the network connections that form the network. Thus, one stage of industrial nodes may selectively power-up or power-down a subsequent stage or a preceding stage of industrial nodes along any selected network path. For instance, this selective power-up in cascaded stages may occur to selective perform diagnostics in a power controller manner along a network path. Then, specific industrial nodes may be powered-up or powered-down to various degrees depending on the results of the diagnostics (e.g., with successful diagnostics resulting in full power-up).

In another aspect, the selective application and removal of power facilitates reducing overall power consumption. For instance, the selective application of power over the network connections to additional industrial nodes may occur when load increases beyond pre-determined load thresholds. This may help ensure, for instance, that excess industrial nodes are not powered-up unless it is sensible to spend the power to help handle load. The techniques thereby support green behavior in the industrial nodes.

In some implementations, an industrial node may have one or more specific management network ports with PoN delivery capability. An industrial node may probe with PoN to, as examples, detect breaks in a communication line or detect cutting of cables or intentional/unintentional unplugging of cables; coordinate control via PoN, e.g., by using PoN to help control any specific industrial node, such as a sensor or actuator; coordinate turning on or off industrial nodes or specific industrial node operations along a process line. In other words, an industrial node may use PoN signaling to help carry out PLC operations that may govern the overall execution of the industrial nodes configured for executing diverse arrays of tasks. Furthermore, an industrial node may employ PoN to the topology of the network that connects the industrial nodes, without having to power-up the entire network of industrial nodes. For instance, an industrial node may apply power specifically to a communication interface in an industrial node, and probe for connectivity. In addition to evaluating or analyzing communication links, an industrial node may employ PoN to run diagnostics of sensors, actuators, machines, or any other industrial node in whole or in part, without having to fully power-up the industrial node.

Figure 7:
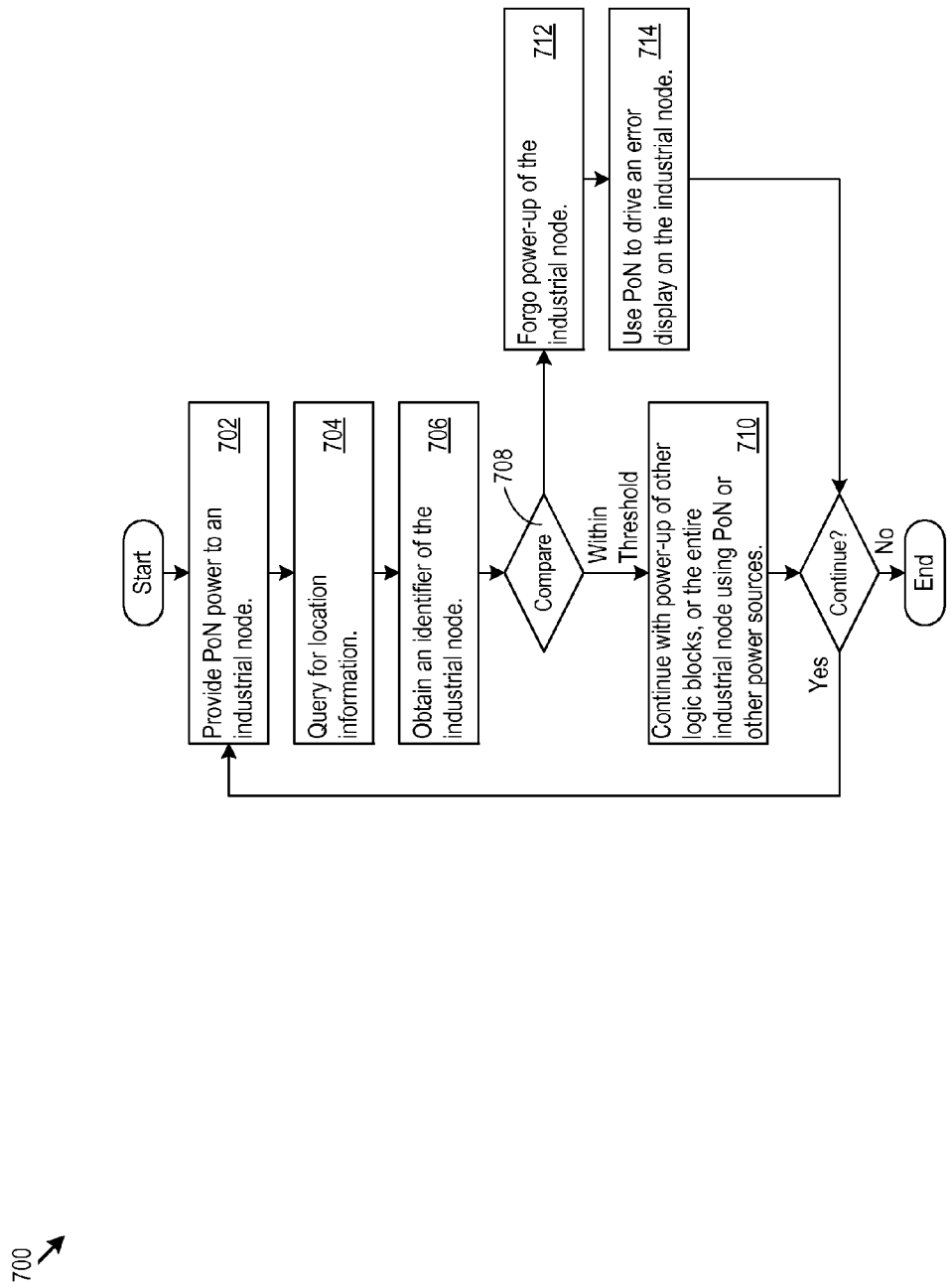
FIG. 7 shows an example of logic that an industrial node may implement.

As an additional example of the PoN techniques, any of the industrial nodes may include location determination logic. The location determination logic may include a GPS, GLONASS, Galileo, or BeiDou receiver, WiFi location module, signal triangulation logic, or other location logic. In that regard, FIG. 7 illustrates example logic 700 that an industrial node may implement, e.g., in control instructions 150. Prior to, or as part of the power-up of the industrial nodes, PoN communication may selectively wake a portion of the industrial node (702). The logic 700 may also query for location information (704), obtain an industrial node identifier (706), and compare the location information against expected positioning for the industrial node (708). If the industrial node is within a location threshold of its expected position, the industrial node may continue power-up and may receive full power, either from PoN or from any other power source (710). Otherwise, the industrial node need not be placed in a power-up mode until, e.g., the location discrepancy is corrected (712). In that case, for instance, PoN may selectively drive a display in the industrial node to facilitate troubleshooting of the problem (714), e.g., by providing power and data for the display.

The PoN techniques further extend to setup and negotiation of a particular amount of power requested by an industrial node. That is, an industrial node may query another industrial node to obtain a response or otherwise determine an amount of power for delivery to a particular industrial node. The PoN interface may also vary or modulate the power signal in any manner to facilitate compliance with the power specifications for a legacy actuator, motor, sensor, or other industrial node.

Voltage delivery to an industrial node may vary widely. For instance, the voltage delivered may meet or exceed 12V, 48V, 60V or another voltage, which may allow for higher power delivery at lower loss. In other words, the PoN may directly deliver a specified voltage over the network cables, without requiring a specific specialized connector or power plug (e.g., a specialized 10K AC power plug). Accordingly, control logic, which may be located anywhere (including in the environment 100) may control PoN delivery directly or over multiple network hops to any industrial nodes such as sensors, actuators, machines, and controllers. As previously mentioned, individual industrial nodes may negotiate their own power delivery. Power delivery may adapt over time to subsequent modifications or reconfigurations to responsive, e.g., to requests or commands from or to any industrial node.

In other implementations, an industrial node may harvest energy from a signal sent over the network to provide the energy needed to carry out any specific task, such as those mentioned above. For instance, an industrial node may harvest energy from a network packet sent over data lines to the industrial node. The packet may be constructed to provide, e.g., a specific portion for energy collection (e.g., the first portion of the packet), followed by the data, command, or control information. The energy collection portion may provide the energy used by the industrial node to wake up, subsequently receive data that follows the energy collection portion, perform requested commands or configuration, and respond. In other implementations, the signal sent to an industrial node may include a data modulation on top of a power harvestable carrier wave. The modulation may follow an energy harvestable signal segment that provides energy for the industrial node to wake and receive the modulated data. These power and data delivery mechanisms may support many sensors, actuators, or other industrial nodes.

The methods, devices, instructions and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store program instructions that perform any of the system processing described above.

While various embodiments have been described, it will be apparent to those of ordinary skill in the art that many more embodiments and implementations are possible. Accordingly, the embodiments are not to be restricted except in light of the attached claims and their equivalents.

What is claimed is:

1. A system comprising:
a network connection;
a power connection adapted to receive first power from the network connection;
a first logic block in communication with the power connection, the first logic block configured to:
operate on the first power from the network connection when the first power is selectively provided to the first logic block; and
determine location information;
a second logic block different from the first logic block, the second logic block configured to run on second power in addition to the first power; and
control circuitry within the first logic block, the control circuitry in communication with the network connection, the power connection, the first logic block, and the second logic block, the control circuitry configured to:
receive a query from a requester over the network connection for the location information;
return the location information over the network connection to the requester; and responsive to receiving a location confirmation command from the requester, power-up the second logic block by causing the second power to be provided to the second logic block.

2. The system of claim 1, where the first logic block comprises a network physical layer.

3. The system of claim 1, where the network connection comprises a data receive connection; and
the first logic block is configured to receive the query on the data receive connection.

4. The system of claim 1, where the first logic block is configured to receive the query modulated on the power connection.

5. The system of claim 1, where the first logic block is further operable to receive location error information to display.

6. The system of claim 1, where the first logic block is further operable to:
obtain the location information from a location logic block in the system.

7. The system of claim 6, where the location logic block is configured to receive power from the power connection.

8. A system comprising:
a network connection;
a power controller coupled to the network connection;
control circuitry in communication with the network connection and the power controller, the control circuitry configured to:
determine that a specific logic block in a target industrial node is configured to provide location information for the target industrial node;
provide first power via the power controller over the network connection to the specific logic block in the target industrial node without causing the target industrial node to power-up in its entirety;
receive the location information responsive to providing the first power to the specific logic block; and
responsive to the location information, send a location confirmation message to the target industrial node to cause the target industrial node to obtain second power to cause the target industrial node to power-up additional circuitry other than the specific logic block.

9. The system of claim 8, where the specific logic block is further configured to perform a selected task prior to power-up of the target industrial node in its entirety.

10. The system of claim 9, where the selected task comprises a diagnostic task.

11. The system of claim 9, where the selected task comprises a configuration task.

12. The system of claim 9, where the selected task comprises a mode setting task for the target industrial node.

13. The system of claim 9, where the selected task comprises a security task.

14. The system of claim 9, where the selected task comprises a connectivity verification task.

15. The system of claim 8, where the control circuitry is further configured to:
prior to providing first power over the network connection to the specific logic block in the target industrial node, provide third power over the network connection to an initial logic block in an initial industrial node;
request status information from the initial logic block;

in response to the request, determine that the initial industrial node has had a failure;
responsive to the failure:
disable the initial logic block of the initial industrial node by discontinuing provision of the third power; and
instead deliver the first power over the network connection to the specific logic block of the target industrial node.

16. The system of claim 15, where the control circuitry is configured to determine that the initial industrial node has had the failure when the system receives an error status from the initial logic block.

17. The system of claim 15, where the control circuitry is configured to determine that the initial industrial node has had the failure when there is a communication failure with the initial logic block.

18. A product comprising:
a machine-readable medium other than a transitory signal;
instructions stored on the machine-readable medium, the instructions, when executed, configured to cause a processor to:
cause power controller circuitry to provide first power over a network connection to a specific logic block within a target industrial node without causing the target industrial node to power-up in its entirety;
receive location information from the specific logic block responsive to providing the first power to the specific logic block; and
responsive to the location information, send a location confirmation message to the target industrial node to cause the target industrial node to obtain second power in excess of the first power to cause the target industrial node to power-up additional circuitry other than the specific logic block.

19. The product of claim 18, where the instructions are further configured to cause the processor to request the location information by sending a query modulated over a power connection, the power connection coupled to the network connection and configured to supply the first power.

20. The product of claim 18, where the instructions are further configured to cause the processor to receive location error information from the specific logic block for display.

* * * * *